United States Patent
Bramson et al.

(10) Patent No.: US 10,272,917 B2
(45) Date of Patent: Apr. 30, 2019

(54) FLAT TOW ASSISTANCE

(71) Applicant: Ford Global Technologies, LLC, Dearborn, MI (US)

(72) Inventors: Eric David Bramson, Ann Arbor, MI (US); Ray C. Siciak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 248 days.

(21) Appl. No.: 15/397,022

(22) Filed: Jan. 3, 2017

(65) Prior Publication Data
US 2018/0186377 A1 Jul. 5, 2018

(51) Int. Cl.
| | |
|---|---|
| *B60W 30/182* | (2012.01) |
| *B60W 10/18* | (2012.01) |
| *B60W 30/14* | (2006.01) |
| *B60W 10/30* | (2006.01) |
| *B60W 50/14* | (2012.01) |
| *G05D 1/00* | (2006.01) |
| *G05D 1/02* | (2006.01) |
| *B60L 50/61* | (2019.01) |
| *B60L 58/12* | (2019.01) |

(52) U.S. Cl.
CPC ........... *B60W 30/182* (2013.01); *B60L 50/61* (2019.02); *B60L 58/12* (2019.02); *B60W 10/18* (2013.01); *B60W 10/30* (2013.01); *B60W 30/146* (2013.01); *B60W 50/14* (2013.01); *G05D 1/0055* (2013.01); *G05D 1/0287* (2013.01); *B60L 2240/12* (2013.01); *B60L 2250/12* (2013.01); *B60L 2250/24* (2013.01); *B60W 2720/10* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 6,225,895 B1 | 5/2001 | Bigelow, Jr. | |
| 6,633,811 B1 * | 10/2003 | Aumayer | B60K 31/185 180/170 |
| 8,013,759 B1 | 9/2011 | Aid et al. | |
| 8,364,115 B2 | 1/2013 | Blair et al. | |
| 8,430,458 B2 | 4/2013 | Kaminski et al. | |
| 8,532,870 B2 * | 9/2013 | Hoetzer | B60T 8/1708 280/656 |
| 8,862,283 B2 * | 10/2014 | Kahler | G01C 21/34 340/431 |

(Continued)

OTHER PUBLICATIONS

Search Report from United Kingdom Intellectual Property Office dated Jun. 25, 2018 regarding GB Application No. GB1800041.4 (3 pages).

*Primary Examiner* — Ryan Rink
(74) *Attorney, Agent, or Firm* — Frank Lollo; Bejin Bieneman PLC

(57) ABSTRACT

A vehicle system includes a processor programmed to establish communication between a first vehicle and a second vehicle, identify one of the vehicles as a towing vehicle and the other as a towed vehicle, and limit operation of the towing vehicle according to constraints associated with the towed vehicle. In some implementations, the vehicle system detects that the towing vehicle is flat-towing the towed vehicle and that the towed vehicle is not operating in a neutral tow mode.

20 Claims, 4 Drawing Sheets

(56) References Cited

U.S. PATENT DOCUMENTS

| | | | |
|---|---|---|---|
| 9,501,877 B2* | 11/2016 | Andrus | G07C 5/0808 |
| 2005/0093366 A1 | 5/2005 | Elstad et al. | |
| 2008/0243336 A1* | 10/2008 | Fitzgibbons | B60G 17/016 |
| | | | 701/38 |
| 2008/0257656 A1 | 10/2008 | Skinner et al. | |
| 2009/0023551 A1* | 1/2009 | Eriksson | F16H 61/0213 |
| | | | 477/80 |
| 2009/0078521 A1* | 3/2009 | Ohtomo | B60L 3/0092 |
| | | | 191/12 R |
| 2010/0156667 A1* | 6/2010 | Bennie | B60C 23/009 |
| | | | 340/902 |
| 2010/0198492 A1* | 8/2010 | Watanabe | B60W 40/12 |
| | | | 701/124 |
| 2013/0151111 A1* | 6/2013 | Skelton | B60R 25/00 |
| | | | 701/99 |
| 2013/0253814 A1* | 9/2013 | Wirthlin | G01G 19/02 |
| | | | 701/124 |
| 2013/0311058 A1* | 11/2013 | Wojtkowicz | B60L 3/0046 |
| | | | 701/70 |
| 2014/0136060 A1* | 5/2014 | Deurloo | F16H 61/0204 |
| | | | 701/51 |
| 2014/0188367 A1 | 7/2014 | North et al. | |
| 2014/0324248 A1* | 10/2014 | Huntzicker | B60D 1/24 |
| | | | 701/2 |
| 2015/0066296 A1* | 3/2015 | Trombley | B62D 13/06 |
| | | | 701/41 |
| 2015/0298738 A1* | 10/2015 | Hoel | B62D 13/06 |
| | | | 701/41 |
| 2015/0379784 A1 | 12/2015 | Gotz et al. | |
| 2016/0180707 A1* | 6/2016 | MacNeille | G08G 1/0962 |
| | | | 701/117 |
| 2016/0245659 A1* | 8/2016 | Ohba | G01C 21/3697 |
| 2016/0297411 A1* | 10/2016 | Trombley | B60T 8/1708 |
| 2016/0297476 A1* | 10/2016 | Trombley | B60T 8/1708 |
| 2017/0235307 A1* | 8/2017 | Asakura | B60W 40/12 |
| | | | 701/23 |

* cited by examiner

FLAT TOW ASSISTANCE

BACKGROUND

Flat-towing refers to towing a vehicle (the towed vehicle) with all four wheels on the ground. Flat-towing is more common in recreational settings. Thus, a common scenario for flat-towing includes flat-towing a car behind a recreational vehicle (RV).

DETAILED DESCRIPTION

Flat-towing raises additional concerns not present when the towed vehicle is towed at an incline (i.e., with the front or rear wheels off the ground) or when the towed vehicle is placed on a truck bed or trailer (i.e., no wheels on the ground). All of the towed vehicle's wheels rotate during flat-towing. Thus, in an electrified vehicle (e.g., a hybrid vehicle or an electric vehicle), which is a vehicle that has at least a subset of wheels powered by a motor, the rotation of the wheels during a flat-tow operation can impart forces on the motor. If those forces exceed the design constraints of the motor, the flat-towing operation can significantly damage the motor, and possibly impair the towed vehicle.

One solution includes incorporating a flat-tow assistance system into the towing vehicle, the towed vehicle, or both. The flat-tow assistance system includes a processor programmed to establish communication between a first vehicle and a second vehicle, identify one of the vehicles as a towing vehicle and the other as a towed vehicle, and limit operation of the towing vehicle based at according to constraints associated with the towed vehicle. In some implementations, the processor is programmed to detect that the towing vehicle is flat-towing a towed vehicle, that the towed vehicle is not operating in a neutral tow mode, or both. The processor may be incorporated into the towing vehicle, the towed vehicle, or a mobile device such as a smartphone, tablet computer, laptop computer, remote server, etc.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
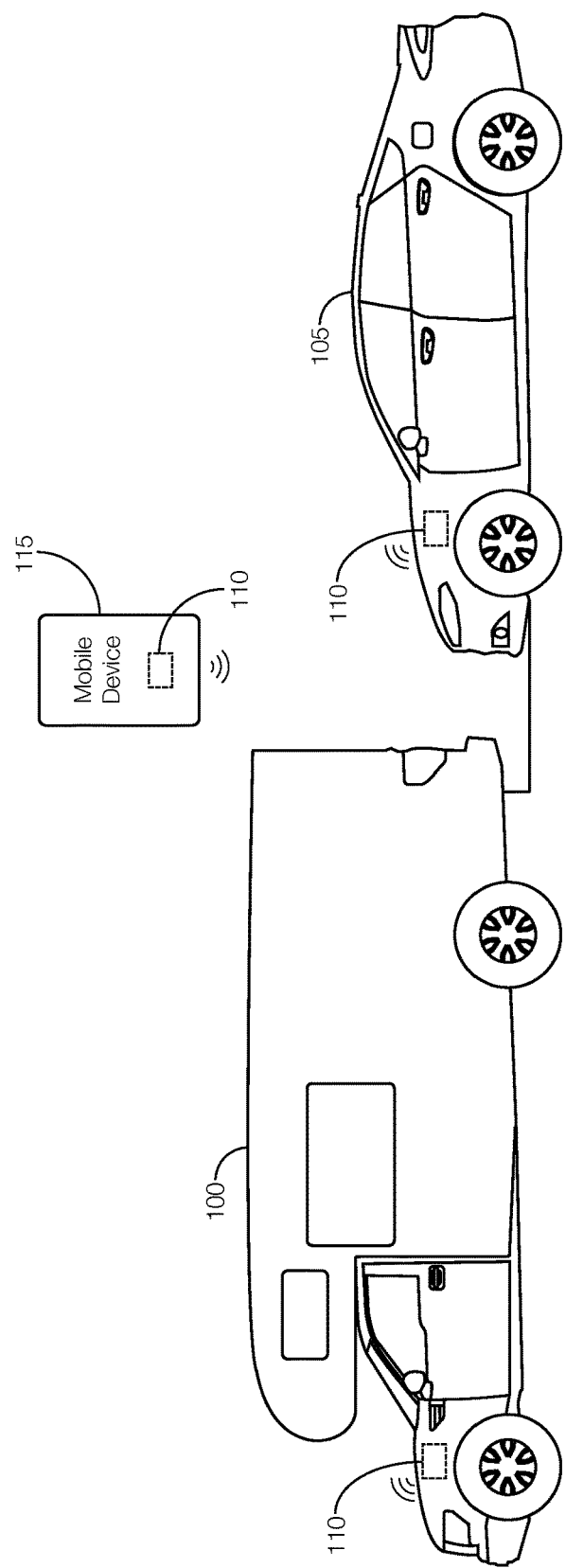
FIG. 1 illustrates an example towing vehicle (illustrated as a recreational vehicle) flat-towing a towed vehicle (illustrated as a sedan), either of which could have a flat-tow assistance system.

As illustrated in FIG. 1, a towing vehicle 100, a towed vehicle 105, or both, include a flat-tow assistance system 110. The towing vehicle 100 or towed vehicle 105 may be any passenger or commercial automobile such as a car, a truck, a sport utility vehicle, a crossover vehicle, a van, a minivan, a taxi, a bus, recreational vehicle (RV), etc. The towing vehicle 100, the towed vehicle 105, or both, may be an electrified vehicle, such as a hybrid or electric vehicle. The flat-tow assistance system 110, whether incorporated into the towing vehicle 100, the towed vehicle 105, or a mobile device 115, can establish communication between the towing vehicle 100 and the towed vehicle 105. Further, in some instances, the flat-tow assistance system 110 may identify which vehicle is the towing vehicle 100 and which is the towed vehicle 105. Further, in some implementations, the flat-tow assistance system 105 can detect whether the towing vehicle 100 is flat-towing the towed vehicle 105 and can detect whether the towed vehicle 105 is not operating in a neutral tow mode. The flat-tow assistance system 105 can limit operation of the towing vehicle 100 according to constraints associated with the towed vehicle 105, especially if the towed vehicle 105 is not in a neutral gear or otherwise operating in the neutral tow mode. Moreover, the flat-tow assistance system 100 may establish communication between the towing vehicle 100 and the towed vehicle 105 even if the towed vehicle 105 is inactive (e.g., the ignition of the towed vehicle 105 is in an off position or the towed vehicle 105 is otherwise not in an operational mode) and the towing vehicle 100 is active (e.g., the ignition of the towing vehicle is in an on position or the towing vehicle 100 is otherwise in an operational mode).

If the towed vehicle 105 is an electrified vehicle, such as a hybrid or electric vehicle, the flat-tow assistance system 110 may limit the operation of the towing vehicle 105 by, e.g., outputting control signals to the towing vehicle 100 that limit the maximum speed of the towing vehicle 100 while flat-towing the towed vehicle 105. The maximum speed may be a function of the maximum speed the towed vehicle 105 can travel while at least a subset of the wheels of the towed vehicle 105 are engaged with, e.g., an electric motor. For instance, the speed of the towed vehicle 105 during a flat-tow operation may be limited to a maximum speed of, e.g., 70 miles per hour.

The flat-tow assistance system 110, when incorporated into the towing vehicle 100 or the mobile device 115, may be programmed to determine that the towed vehicle 105 is not in a neutral gear or otherwise operating in the neutral tow mode based on messages received from the towed vehicle 105. This may occur if, e.g., an owner of the towed vehicle 105 forgot to put the towed vehicle 105 in the neutral tow mode or neutral gear prior to beginning to flat-tow the towed vehicle 105. In some instances, the flat-tow assistance system 110 may transmit a command to the towed vehicle 105 that commands the towed vehicle 105 to operate in the neutral tow mode, which could include shifting the gear to a neutral gear. In addition or in the alternative, the flat-tow assistance system 110 may present an alert inside the passenger compartment of the towing vehicle 100 alerting the driver that the towed vehicle 105 is not operating in the neutral tow mode. The alert may also identify the constraints that must be observed while the towed vehicle 105 is not operating in the neutral tow mode during the flat-tow operation. In some possible approaches, the flat-tow assistance system 110 may output control signals to various controllers of the towing vehicle 100 limiting operation of the towing vehicle 100 to the constraints of the towed vehicle 105 when the towed vehicle 105 is not operating in the neutral tow mode.

Figure 2:
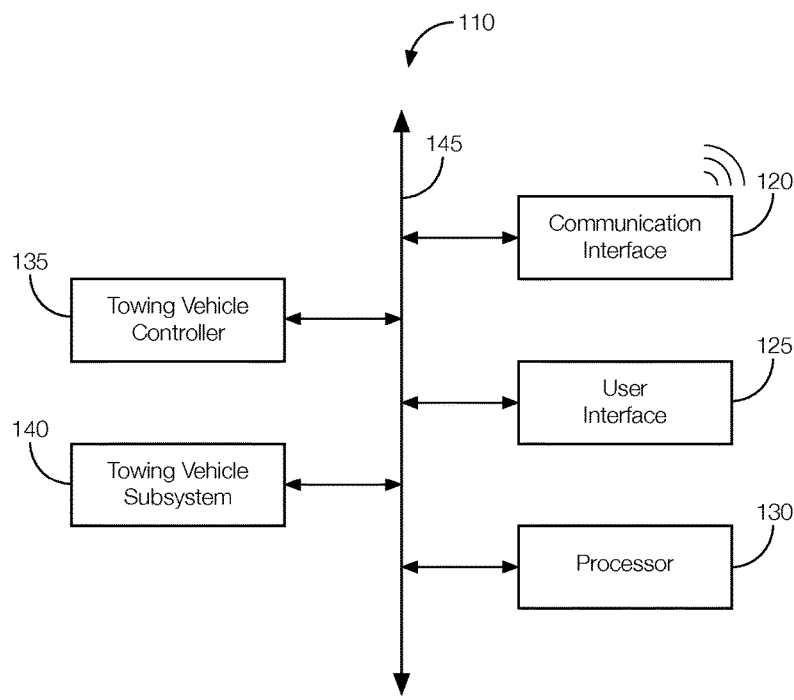
FIG. 2 is a block diagram illustrating example components of a flat-tow assistance system incorporated into the towing vehicle.
Figure 4:
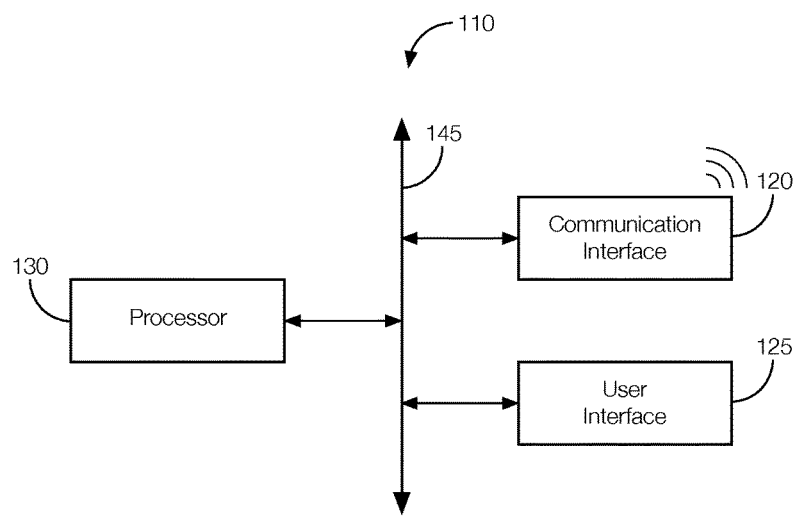
FIG. 4 is a block diagram illustrating example components of the flat-tow assistance system incorporated into a mobile device.
Figure 3:
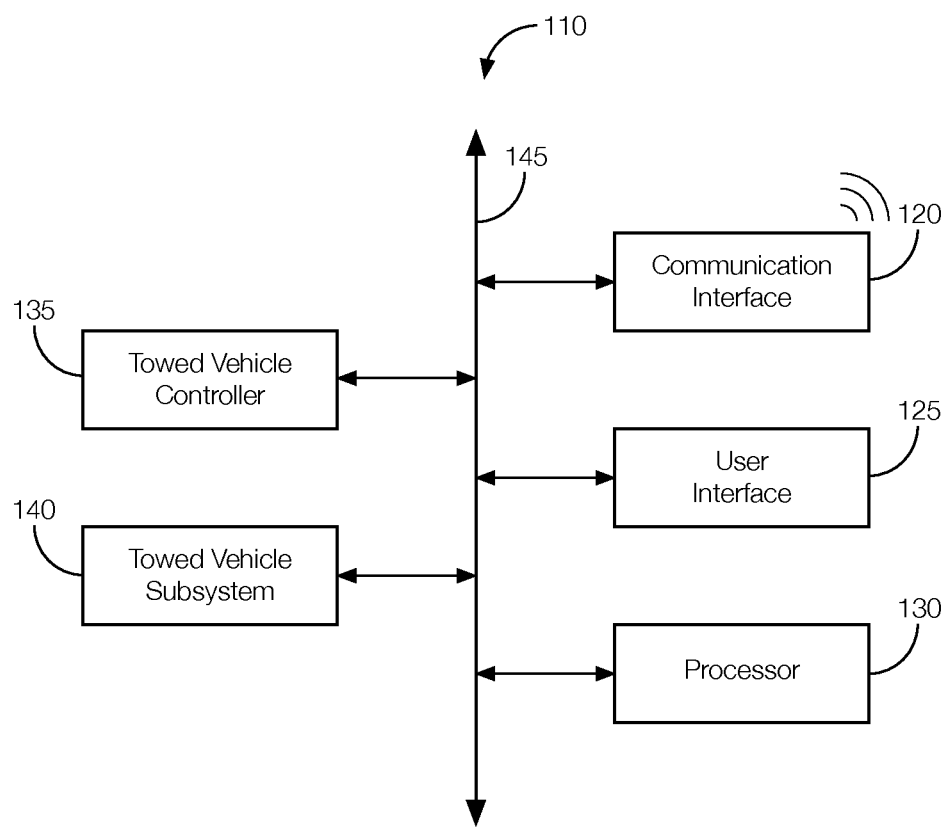
FIG. 3 is a block diagram illustrating example components of a flat-tow assistance system incorporated into the towed vehicle.

FIGS. 2-4 are block diagrams illustrating example components of the flat-tow assistance system 110 incorporated into the towing vehicle 100 (FIG. 2), the towed vehicle 105

(FIG. 3), or the mobile device 115 (FIG. 4). As shown, the flat-tow assistance system 110 includes, works in accordance with, or is otherwise implemented by one or more of a communication interface 120, a user interface 125, and a processor 130. The flat-tow assistance system 110 communicates with the towed vehicle 105, the mobile device 115, a vehicle controller 135 located in the towing vehicle 100 and controlling a subsystem 140 of the towing vehicle 100, or a combination thereof. The components of the flat-tow assistance system 110 are in communication with components of the towing vehicle 100 through, e.g., a wired or wireless communication link 145 such as a controller area network (CAN) bus, Ethernet, Bluetooth®, Bluetooth® Low Energy, or the like.

The communication interface 120 is implemented via an antenna, circuits, chips, or other electronic components that can transmit messages to the mobile device 115, the towing vehicle 100, the towed vehicle 105, or a combination thereof. For instance, the communication interface 120 may facilitate the pairing of any combination of the mobile device 115, the towing vehicle 100, and the towed vehicle 105. The communication interface 120 may be programmed to communicate in accordance with any number of wired or wireless communication protocols including a cellular telecommunications protocol, a satellite telecommunication protocol, CAN, Ethernet, Bluetooth®, Bluetooth® Low Energy, WiFi, a vehicle-to-vehicle communication protocol such as the Dedicated Short Range Communication (DSRC) protocol, etc. The communication interface 120 may be programmed to receive messages from the towed vehicle 105, the mobile device 115, or both. Messages received from the towed vehicle 105 or mobile device 115 may be transmitted to the processor 130 over the communication link 145 for processing. Further, the communication interface 120 may be programmed to transmit messages to the towed vehicle 105, the mobile device 115, or both, in accordance with commands received from the processor 130. Thus, the communication interface 120 may be incorporated into the towed vehicle 105, the towing vehicle 100, or the mobile device 115.

The user interface 125 is implemented via circuits, chips, or other electronic components that receive user inputs from inside the towing vehicle 100, the towed vehicle 105, or via the mobile device 115, and present information, such as alerts or information, including constraints, associated with flat-towing the towed vehicle 105. The alerts may include audible alerts, visual alerts, haptic alerts, etc. In some possible implementations, the user interface 125 is a touch-sensitive display screen. User inputs may also or alternatively be received via hard buttons located in the passenger compartment of the towing vehicle 100 or the towed vehicle 105 or virtual buttons presented on the touch-sensitive display screen. The user interface 125 may be incorporated into the towing vehicle 100, the towed vehicle 105, or the mobile device 115.

The processor 130 is implemented via circuits, chips, or other electronic components that are programmable to carry out computer-executable instructions associated with the operation of the flat-tow assistance system 110. Whether incorporated into the towing vehicle 100, the towed vehicle 105, or the mobile device 115, the processor 130 is programmed to establish communication between any combination of the towing vehicle 100, the towed vehicle 105, and mobile device 115, by, e.g., commanding the communication interface 120 to pair with the communication interface 120 of another. Once paired, the processor 130 may be programmed to identify one vehicle as the towing vehicle 100 and the other vehicle as the towed vehicle 105. The processor 130 may distinguish the vehicles according to identification signals (e.g., signals including the vehicle identification number or another unique identifier of the vehicle) received from the respective vehicles via the communication interface 120. Further, in some possible implementations, the processor 130 may detect that the towing vehicle 100 is flat-towing a towed vehicle 105, detect that the towed vehicle 105 is not operating in a neutral tow mode, or both. Further, the processor 130 is programmed to limit operation of the towing vehicle 100 according to constraints associated with the towed vehicle 105.

The processor 130 is programmed to detect that the towing vehicle 100 is flat-towing the towed vehicle 105 based on communications, such as intra-vehicle communications over the communication link 145 or communications via the communication interface 120, with the towed vehicle 105, via a user input, or a combination thereof. For instance, when the processor 130 is incorporated into the mobile device 115 or the towing vehicle 100, the processor 130 may prompt a user to provide a user input indicating whether the towing vehicle 100 is flat-towing the towed vehicle 105. When the processor 130 is incorporated into the towed vehicle 105, the flat-towing of the towed vehicle 105 may be detected via intra-vehicle communications. That is, a controller 135 located in the towed vehicle 105 may communicate with the processor 130 to indicate that the towed vehicle 105 is being flat-towed. When the processor 130 is incorporated into the mobile device 115 or the towed vehicle 105, the processor 130 may be programmed to command the communication interface 120 to transmit a message to the towing vehicle 100 indicating that the flat-tow operation has been detected. As such, a processor 130 located in the towing vehicle 100 may receive the message from the mobile device 115 or the towed vehicle 105, and detect or confirm the flat-tow operation from such a message.

The processor 130 is programmed to detect whether the towed vehicle 105 is operating in the neutral tow mode based on communications, such as intra-vehicle communications over the communication link 145 or communications via the communication interface 120, with the towed vehicle 105, via a user input, or a combination thereof. For instance, when the processor 130 is incorporated into the mobile device 115 or the towing vehicle 100, the processor 130 may be programmed to detect that the towed vehicle 105 is operating in the neutral tow mode by transmitting a query to the towed vehicle 105. The query may be transmitted by the communication interface 120 and may request that the towed vehicle 105 respond with whether or not the towed vehicle 105 is operating in a neutral tow mode. The towed vehicle 105 may transit a message in response to the query, and the processor 130 may be programmed to determine whether the towed vehicle 105 is operating in the neutral tow mode based at least in part on the message transmitted from the towed vehicle 105. That is, the processor 130 may receive the message, via the communication interface 120, and process the message. When the processor 130 is incorporated into the towed vehicle 105, the processor 130 may detect whether the towed vehicle 105 is operating in the neutral tow mode based in intra-vehicle communications with, e.g., a controller 135 located in the towed vehicle 105 that controls the operations of the towed vehicle 105 while operating in the neutral tow mode. When the processor 130 is incorporated into the mobile device 115 or the towed vehicle 105, the processor 130 may be programmed to command the communication interface 120 to transmit a message to the towing vehicle 100 indicating whether or not the towed vehicle 105 is operating in the neutral tow mode. As such, a processor 130 located in the towing vehicle 100 may receive the message from the mobile device 115 or the towed vehicle 105, and determine whether the towed vehicle 105 is operating in the neutral tow mode from such a message.

The processor 130 may be programmed to limit operation of the towing vehicle 100 based on the constraints of the towed vehicle 105. Limiting operation of the towing vehicle 100 may include the processor 130 outputting control signals to the vehicle controller 135 that controls one or more subsystems 140 of the towing vehicle 100. The control signal may impose limits on the operation of the subsystem 140 via the vehicle controller 135 and in accordance with the constraints of the towed vehicle 105. For example, the control signal may be output to a controller 135 associated with the powertrain of the towing vehicle 100, and the control signal may limit the maximum speed of the towing vehicle 100 while flat-towing the towed vehicle 105. The processor 130 may be programmed to output the control signal regardless of whether the processor 130 is incorporated into the towing vehicle 100, the towed vehicle 105, or the mobile device 115. If incorporated into the towing vehicle 100, the processor 130 may output the control signal via the communication link 145. If incorporated into the towed vehicle 105 or the mobile device 115, the processor 130 may command the communication interface 120 to transmit the control signal to the communication interface 120 of the towing vehicle 100.

Further, in some instances, the processor 130 may be programmed to command the towed vehicle 105 to operate in the neutral tow mode after determining that the towed vehicle 105 is not operating in the neutral tow mode. Commanding the towed vehicle 105 to operate in the neutral tow mode may include the processor 130, located in the towing vehicle 100 or the mobile device 115, to command the communication interface 120 to transmit a control signal, to the towed vehicle 105, commanding the towed vehicle 105 to operate in the neutral tow mode. The control signal may be received by the communication interface 120 incorporated into the towed vehicle 105, and the communication interface 120 may pass the control signal to the subsystem 140 incorporated into the towed vehicle 105 associated with controlling whether the towed vehicle 105 is operating in the neutral tow mode. In some instances, if the processor 130 is incorporated into the towing vehicle 100, the processor 130 may command the communication interface 120 to transmit the control signal to the mobile device 115, which in turn may transmit the control signal to the towed vehicle 105. Thus, the mobile device 115 may serve as a relay for the control signal. If the processor 130 is incorporated into the towed vehicle 105, the processor 130 may output the control signal to the controller 135 via the communication link 145 in the towed vehicle 105.

In some instances, the processor 130 is programmed to command the user interface 125 to present various information to the operator of the towing vehicle 100. For instance, when the user interface 125 is located in the towing vehicle 100 or the mobile device 115, after determining that the towed vehicle 105 is not operating in the neutral tow mode, the processor 130 may be programmed to command the user interface 125 to present an alert indicating that the towed vehicle 105 is not operating in the neutral tow mode. In some instances, the alert may identify certain operations of the towing vehicle 100 (such as the maximum speed) that will be limited while flat-towing the towed vehicle 105. The alert may also or alternatively serve as a reminder to the operator of the towing vehicle 100 to respect the constraints of the towed vehicle 105 during the flat-towing operation.

The processor 130 may monitor and control certain operations of the towed vehicle 105 during the flat-tow operation. For instance, the processor 130 may monitor the tire pressure, battery voltage, and speed of the towed vehicle 105 during the flat-tow operation. The processor 130 may monitor these and possibly other characteristics during the flat-tow operation and output various control signals or messages accordingly. For instance, the processor 130 may monitor the battery of the towed vehicle 105 to determine if the battery needs to be charged. If so, the processor 130 may output control signals to start the engine of the towed vehicle 105. If the processor 130 is incorporated into the towed vehicle 105, the control signals may be output to the appropriate controller 135 located in the towed vehicle 105 across the communication link 145. If the processor 130 is incorporated into the towing vehicle 100 or the mobile device 115, the processor 130 may transmit the control signals to the towed vehicle 105 via the communication interface 120.

The processor 130 may monitor the tire pressure of the tires of the towed vehicle 105 to determine if the tires need to be inflated. If so, the processor 130 may command the user interface 125 of the towed vehicle 105 or mobile device 115 to present an alert recommending that the operator of the towed vehicle 105 stop and inflate the tires of the towed vehicle 105. If the processor 130 is incorporated into the towed vehicle 105, the alert may be transmitted via the communication interface 120 to the towed vehicle 105 or to the mobile device 115 so that the alert can be presented on the user interface 125 of one or both of the towed vehicle 105 or mobile device 115. If the processor 130 is incorporated into the towing vehicle 100 or the mobile device 115, the processor 130 may output the alert via the user interface 125 of the towing vehicle 100, mobile device 115, or both.

If the processor 130 determines that the speed of the towed vehicle 105 exceeds a maximum allowable speed for flat-towing, the processor 130 may command the user interface 125 of the towed vehicle 105 or mobile device 115 to present an alert recommending that the operator of the towed vehicle 105 slow down. If the processor 130 is incorporated into the towed vehicle 105, the alert may be transmitted via the communication interface 120 to the towed vehicle 105 or to the mobile device 115 so that the alert can be presented on the user interface 125 of one or both of the towed vehicle 105 or mobile device 115. If the processor 130 is incorporated into the towing vehicle 100 or the mobile device 115, the processor 130 may output the alert via the user interface 125 of the towing vehicle 100, mobile device 115, or both.

If the processor 130 determines that the towed vehicle 105 is not operating in the neutral tow mode, the processor 130 may command the user interface 125 of the towed vehicle 105 or mobile device 115 to present an alert recommending that the operator of the towing vehicle 105 respect the constraints of the towed vehicle 105, place the towed vehicle 105 into the neutral tow mode (which may include placing the towed vehicle 105 in a neutral gear), or both. If the processor 130 is incorporated into the towed vehicle 105, the alert may be transmitted via the communication interface 120 to the towed vehicle 105 or to the mobile device 115 so that the alert can be presented on the user interface 125 of one or both of the towed vehicle 105 or mobile device 115. If the processor 130 is incorporated into the towing vehicle 100 or the mobile device 115, the processor 130 may output the alert via the user interface 125 of the towing vehicle 100, mobile device 115, or both.

The processor 130 may further control certain operations of the towed vehicle 105 without necessarily monitoring the status of any components of the towed vehicle 105. For instance, the processor 130 may periodically output control signals that cause the towed vehicle 105 to circulate oil through the transmission of the towed vehicle 105. If the processor 130 is incorporated into the towed vehicle 105, the control signals may be output to the appropriate controller 135 located in the towed vehicle 105 across the communication link 145. If the processor 130 is incorporated into the towing vehicle 100 or the mobile device 115, the processor 130 may transmit the control signals to the towed vehicle 105 via the communication interface 120.

Further, the processor 130 may be further programmed to coordinate certain actions between the towing vehicle 100 and the towed vehicle 105. For instance, the processor 130 may be programmed to detect when the towing vehicle 100 is placed in reverse and command a rear-facing camera of the towed vehicle 105 to turn on. The processor 130 may further command images captured by the rear-facing camera of the towed vehicle 105 to be transmitted to the user interface 125 of the towing vehicle. As discussed above, the communication interface 125, communication link 145, or both, may be used by the processor 130 to communicate the commands and images among any combination of the towing vehicle 100, the towed vehicle 105, and the mobile device 115. Another example may include the processor 130 outputting control signals to control breaking of the towed vehicle 105. For instance, the processor 130 may be programmed to detect an aggressive braking by the towing vehicle 100 and output a control signal to the towed vehicle 105 commanding the towed vehicle 105 to apply a particular braking torque. This way, the towed vehicle 105 may contribute to the aggressive braking maneuver.

Figure 5:
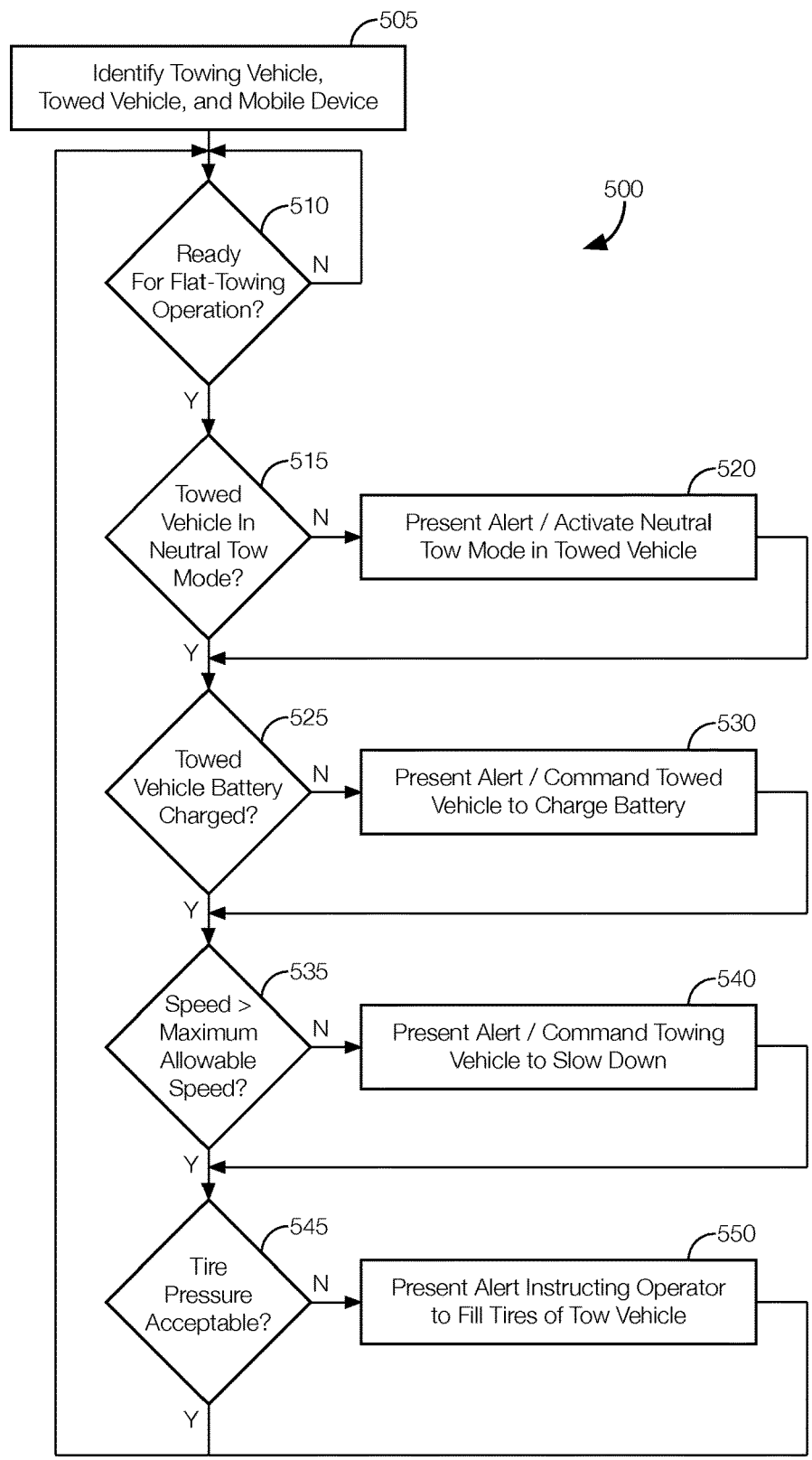
FIG. 5 is a flowchart of an example process that may be executed by the flat-tow assistance system.

FIG. 5 is a flowchart of an example process 500 that may be executed by the flat-tow assistance system 110. The process 500 may be executed by the flat-tow assistance system 110 regardless of whether the flat-tow assistance system 110 is incorporated into the mobile device 115, the towing vehicle 100, or the towed vehicle 105.

At block 505, the flat-tow assistance system 110 establishes communication between the towing vehicle 100, the towed vehicle 105, the mobile device 115, or a combination thereof. Moreover, the flat-tow assistance system 100 may identify which vehicle is the towing vehicle 100 and which vehicle is the towed vehicle 105 based on, e.g., identification signals received from the towing vehicle 100 and the towed vehicle 105. If incorporated into the towing vehicle 100, the processor 130 may identify and pair with the towed vehicle 105, the mobile device 115, or both. If incorporated into the towed vehicle 105, the processor 130 may identify and pair with the towing vehicle 100, the mobile device 115, or both. If incorporated into the mobile device 115, the processor 130 may identify and pair with the towing vehicle 100, the towed vehicle 105, or both. Pairing may include executing a handshake procedure via messages sent by the communication interface 120 of the towing vehicle 100, the towed vehicle 105, the mobile device 115, or a combination thereof, even if one vehicle (i.e., the towed vehicle 105) is inactive while the other vehicle (i.e., the towing vehicle 100) is active. The handshake may include, e.g., components of the towed vehicle 105 communicating flat-towing constraints of the towed vehicle 105 to the flat-tow assistance system 110. Once paired, the flat-tow assistance system 110 may receive data from components located in the towing vehicle 100, the towed vehicle 105, the mobile device 115, etc.

At decision block 510, the flat-tow assistance system 110 determines whether the towed vehicle 105 is ready for flat-towing. For instance, the processor 130 may determine whether the towed vehicle 105 is in a gear other than "park." If the flat-tow assistance system 110 is incorporated into the towing vehicle 100 or the mobile device 115, the communication interface 120 may receive a message from the towed vehicle 105 indicating the gear of the towed vehicle 105. The processor 130 may determine that the towed vehicle 105 is in a gear other than "park" based on that message. If the flat-tow assistance system 110 is incorporated into the towed vehicle 105, the processor 130 may determine that the towed vehicle 105 is in a gear other than "park" based on a communication received from a controller 135 located in the towed vehicle 105 over the communication link 145. If the towed vehicle 105 is in a gear other than "park," the process 500 may proceed to block 515. If the towed vehicle 105 is in "park" or otherwise not ready for flat-towing, the process 500 may continue to execute block 510 until the towed vehicle 105 is ready for flat-towing.

At decision block 515, the flat-tow assistance system 110 determines if the towed vehicle 105 is in neutral tow mode. The processor 130 may determine whether the towed vehicle 105 is in the neutral tow mode based on communications from, e.g., controllers 135 in the towed vehicle 105. The communications may be received by the processor 130 over the communication link 145 if the flat-tow assistance system 110 is incorporated into the towed vehicle 105 or via the communication interface 120 if the flat-tow assistance system 110 is incorporated into the towing vehicle 100 or the mobile device 115. If the processor 130 determines that the vehicle is not operating in the neutral tow mode, the process 500 may proceed to block 520. If the processor 130 determines that the towed vehicle 105 is operating in the neutral tow mode, the process 500 may proceed to block 525.

At block 520, the flat-tow assistance system 110 prompts the operator of the towing vehicle 100 to place the towed vehicle 105 into the neutral tow mode. Prompting the operator may include the processor 130 commanding the user interface 125 of the towing vehicle 100, the towed vehicle 105, the mobile device 115, or a combination thereof, to present an alert to the operator. In some instances, the prompt may further provide the operator with the option of remotely setting the towed vehicle 105 in the neutral tow mode by, e.g., providing a user input to the user interface 125 of the flat-tow assistance system 110. If the user input is received, the processor 130 may command the towed vehicle 105 to operate in the neutral tow mode. Commanding the towed vehicle 105 to operate in the neutral tow mode may include the processor 130 transmitting a control signal, via the communication interface 120 or communication link 145, commanding the towed vehicle 105 to operate in the neutral tow mode. The process 500 may proceed to block 525.

At decision block 525, the flat-tow assistance system 110 determines if the battery of the towed vehicle 105 is sufficiently charged. The processor 130 may make such a determination based on signals received from components of the towed vehicle 105 via the communication link 145 or communication interface 120. If the processor 130 determines that the battery of the towed vehicle 105 is not sufficiently charged, the process 500 may proceed to block 530. Otherwise, the process 500 may proceed to block 535.

At block 530, the flat-tow assistance system 110 prompts the operator of the towing vehicle 100 to run the engine of the towed vehicle 105 for a predetermined amount of time (e.g., 5 minutes, 10 minutes, etc.). Prompting the operator may include the processor 130 commanding the user interface 125 of the towing vehicle 100, the towed vehicle 105, the mobile device 115, or a combination thereof, to present an alert to the operator. In some instances, the prompt may further provide the operator with the option of remotely starting the engine of the towed vehicle 105 to charge the battery by, e.g., providing a user input to the user interface 125 of the flat-tow assistance system 110. If the user input is received, the processor 130 may command the towed vehicle 105 to start its engine for the predetermined amount of time. Commanding the towed vehicle 105 to start its engine may include the processor 130 transmitting a control signal, via the communication interface 120 or communication link 145, commanding, e.g., an engine controller 135 in the towed vehicle 105 to start the engine. The processor 130 may further command the engine of the towed vehicle 105 to turn off after the predetermined amount of time has elapsed by transmitting a control signal via the communication link 145 or communication interface 120. The process 500 may proceed to block 535.

At decision block 535, the flat-tow assistance system 110 determines if the present speed of the towing vehicle 100 is below a maximum allowable towing speed. The processor 130 may receive the maximum allowable speed of the towed vehicle 105 via communications from one or more components of the towed vehicle 105. For instance, the maximum allowable speed may be included in the constraints received at the flat-tow assistance system 110 at block 505. The processor 130 may receive the present speed of the towing vehicle 100 or the towed vehicle 105 from, e.g., components (such as a speedometer or controller 135) located in the towing vehicle 100, a navigation (GPS) system, etc. The processor 130 may be programmed to compare the present speed of the towing vehicle 100 or the towed vehicle 105 to the maximum allowable speed of the towed vehicle 105. If the present speed of the towing vehicle 100 or the towed vehicle 105 meets or exceeds the maximum allowable speed of the towed vehicle 105, the process 500 may proceed to block 540. If the present speed of the towing vehicle 100 is below the maximum allowable speed of the towed vehicle 105, the process 500 may proceed to block 545.

At block 540, the flat-tow assistance system 110 prompts the operator of the towing vehicle 100 to reduce the speed of the towing vehicle 100. Prompting the operator may include the processor 130 commanding the user interface 125 of the towing vehicle 100, the towed vehicle 105, the mobile device 115, or a combination thereof, to present an alert to the operator. In some instances, the processor 130 may automatically command the towing vehicle 100 to reduce its speed to a speed below the maximum allowable speed by, e.g., sending a control signal to a controller 135 associated with controlling the speed of the towing vehicle 100. Commanding the towing vehicle 100 to reduce its speed may include the processor 130 transmitting a control signal via the communication interface 120 or communication link 145. The process 500 may proceed to block 545.

At decision block 545, the flat-tow assistance system 110 determines if the tires of the towed vehicle 105 are sufficiently inflated. The processor 130 may make such a determination based on signals received from components (such as tire sensors) of the towed vehicle 105 via the communication link 145 or communication interface 120. If the processor 130 determines that one or more tires are not sufficiently inflated, the process 500 may proceed to block 550. Otherwise, the process 500 may return to block 505.

At block 550, the flat-tow assistance system 110 prompts the operator of the towing vehicle 100 to inflate one or more tires of the towed vehicle 105. Prompting the operator may include the processor 130 commanding the user interface 125 of the towing vehicle 100, the towed vehicle 105, the mobile device 115, or a combination thereof, to present an alert to the operator. In some instances, the prompt may further identify which tire is insufficiently inflated. The process 500 may proceed to block 505.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a processor programmed to establish communication between a first vehicle and a second vehicle, identify one of the first vehicle and the second vehicle as a towing vehicle and the other of the first vehicle and the second vehicle as a towed vehicle, and wherein the processor is programmed to limit operation of the towing vehicle according to constraints of an electric motor of the towed vehicle.

2. The vehicle system of claim 1, wherein limiting operation of the towing vehicle includes limiting a maximum speed of the towing vehicle while flat-towing the towed vehicle.

3. The vehicle system of claim 1, wherein the processor is programmed to detect that the towed vehicle is not operating in the neutral tow mode based at least in part on a message indicating that the towed vehicle is not operating in a neutral tow mode.

4. The vehicle system of claim 3, wherein the message is received from at least one of a mobile device and the towed vehicle.

5. The vehicle system of claim 1, wherein the processor is programmed to command the towed vehicle to operate in a neutral tow mode.

6. The vehicle system of claim 5, wherein commanding the towed vehicle to operate in the neutral tow mode includes the processor commanding a communication interface to transmit a control signal to the towed vehicle, the control signal commanding the towed vehicle to operate in the neutral tow mode.

7. The vehicle system of claim 6, wherein the communication interface transmits the control signal to a mobile device, and the mobile device transmits the control signal to the towed vehicle.

8. The vehicle system of claim 1, wherein the processor is programmed to command a user interface located in the towing vehicle to present an alert associated with flat-towing the towed vehicle.

9. The vehicle system of claim 8, wherein the alert identifies at least one operation of the towing vehicle to be limited while flat-towing the towed vehicle.

10. The vehicle system of claim 1, wherein limiting operation of the towing vehicle according to constraints of the electric motor of the towed vehicle include the processor outputting a control signal to a vehicle controller controlling a subsystem of the towing vehicle, the control signal imposing limits on the operation of the subsystem according to the constraints of the electric motor of the towed vehicle.

11. A vehicle system comprising:
    a processor, associated with a towed vehicle, programmed to establish communication between the towed vehicle and a towing vehicle, detect that the towing vehicle is flat-towing the towed vehicle, detect that the towed vehicle is not operating in a neutral tow mode, and limit operation of the towing vehicle according to constraints of an electric motor of the towed vehicle.

12. The vehicle system of claim 11, wherein limiting operation of the towing vehicle includes limiting a maximum speed of the towing vehicle while flat-towing the towed vehicle.

13. The vehicle system of claim 11, wherein detecting that the towed vehicle is not operating in the neutral tow mode includes receiving a message, from a controller located in the towed vehicle, indicating that the towed vehicle is not operating in the neutral tow mode and commanding a communication interface to transmit the message to the towing vehicle.

14. The vehicle system of claim 13, wherein commanding the communication interface to transmit the message to the towing vehicle includes one of commanding the communication interface to transmit the message directly to the towing vehicle and commanding the communication interface to transmit the message to a mobile device associated with an operator of the towing vehicle.

15. The vehicle system of claim 11, wherein the processor is programmed to command the towed vehicle to operate in the neutral tow mode.

16. The vehicle system of claim 15, wherein commanding the towed vehicle to operate in the neutral tow mode includes the processor commanding a controller located in the towed vehicle to operate the towed vehicle in the neutral tow mode.

17. The vehicle system of claim 11, wherein the processor is programmed to command a user interface located in the towing vehicle to present an alert when the towed vehicle is not operating in the neutral tow mode.

18. The vehicle system of claim 17, wherein the alert identifies at least one operation of the towing vehicle to be limited while flat-towing the towed vehicle.

19. The vehicle system of claim 11, wherein limiting operation of the towing vehicle according to constraints of the electric motor of the towed vehicle include the processor outputting a control signal to a vehicle controller controlling a subsystem of the towing vehicle, the control signal imposing limits on the operation of the subsystem according to the constraints of the electric motor of the towed vehicle.

20. The vehicle system of claim 11, wherein the processor is programmed to command the towed vehicle to at least one of: charge a battery located in the towed vehicle, turn on a rear-facing camera, and apply brakes of the towed vehicle at a particular braking torque.

* * * * *